United States Patent
Lee

(10) Patent No.: US 12,306,607 B2
(45) Date of Patent: *May 20, 2025

(54) SYSTEM AND METHOD FOR GENERATING MACHINE LEARNING MODEL WITH TRACE DATA

(71) Applicant: Samsung Display Co., Ltd., Yongin-si (KR)

(72) Inventor: Janghwan Lee, Pleasanton, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,379

(22) Filed: Jun. 22, 2023

(65) Prior Publication Data

US 2023/0333533 A1 Oct. 19, 2023

Related U.S. Application Data

(63) Continuation of application No. 16/403,381, filed on May 3, 2019, now Pat. No. 11,714,397.

(Continued)

(51) Int. Cl.
*G05B 19/4063* (2006.01)
*G06N 3/08* (2023.01)

(52) U.S. Cl.
CPC .......... *G05B 19/4063* (2013.01); *G06N 3/08* (2013.01); *G05B 2219/34477* (2013.01)

(58) Field of Classification Search
CPC ...... G05B 19/4063; G05B 2219/34477; G05B 23/024; G05B 2219/32222;

(Continued)

(56) References Cited

U.S. PATENT DOCUMENTS 9,846,932 B2 12/2017 Liu et al.
10,109,046 B2 10/2018 Finlay et al.
(Continued)

FOREIGN PATENT DOCUMENTS

CN 107271925 A 10/2017
CN 108010016 A 5/2018
(Continued)

OTHER PUBLICATIONS

Syafrudin et al., Performance Analysis of IoT-Based Sensor, Big Data Processing, and Machine Learning Model for Real-Time Monitoring System in Automotive Manufacturing,2018, Department of Industrial and Systems Engineering, Dongguk University, Seoul 100-715, Korea; et al., pp. 1-24, (Year: 2018).*

(Continued)

*Primary Examiner* — Kidest Bahta
(74) *Attorney, Agent, or Firm* — Lewis Roca Rothgerber Christie LLP

(57) ABSTRACT

A method for detecting a fault includes: receiving a plurality of time-series sensor data obtained in one or more manufacturing processes of an electronic device; arranging the plurality of time-series sensor data in a two-dimensional (2D) data array; providing the 2D data array to a convolutional neural network model; identifying a pattern in the 2D data array that correlates to a fault condition using the convolutional neural network model; providing a fault indicator of the fault condition in the one or more manufacturing processes of the electronic device; and determining that the electronic device includes a fault based on the fault indicator. The 2D data array has a dimension of an input data to the convolutional neural network model.

20 Claims, 8 Drawing Sheets

Related U.S. Application Data

(60) Provisional application No. 62/801,393, filed on Feb. 5, 2019.

(58) Field of Classification Search
CPC .......... G05B 23/0221; G05B 19/41875; G05B 23/0281; G05B 23/0272; G05B 23/0275; G06N 3/08; G06N 3/045; G06N 20/00; Y02P 90/02; G09G 3/006; G01M 11/00; G01N 2021/8887

See application file for complete search history.

(56) References Cited

U.S. PATENT DOCUMENTS

| | | | |
|---|---|---|---|
| 10,354,462 | B1* | 7/2019 | Zhang ............... G07C 5/085 |
| 10,572,993 | B2 | 2/2020 | Tanaka et al. |
| 10,876,914 | B2 | 12/2020 | Fitzgerald et al. |
| 11,210,777 | B2 | 12/2021 | Fitzgerald et al. |
| 11,853,182 | B2 | 12/2023 | Fitzgerald et al. |
| 2003/0028353 | A1* | 2/2003 | Gventer ............ G06N 3/042 |
| | | | 702/182 |
| 2003/0158795 | A1 | 8/2003 | Markham et al. |
| 2004/0006398 | A1 | 1/2004 | Bickford |
| 2013/0103213 | A1 | 4/2013 | Ma |
| 2014/0298099 | A1 | 10/2014 | Tan et al. |
| 2015/0005903 | A1 | 1/2015 | Worek et al. |
| 2015/0213706 | A1 | 7/2015 | Bai et al. |
| 2015/0310448 | A1 | 10/2015 | Vilain et al. |
| 2015/0347537 | A1 | 12/2015 | Chen et al. |
| 2016/0128179 | A1 | 5/2016 | Okamoto et al. |
| 2016/0364849 | A1 | 12/2016 | Liu et al. |
| 2017/0249534 | A1 | 8/2017 | Townsend et al. |
| 2018/0046149 | A1* | 2/2018 | Ahmed ............ G05B 13/026 |
| 2018/0082201 | A1 | 3/2018 | Cantwell |
| 2018/0096243 | A1 | 4/2018 | Patil et al. |
| 2018/0260704 | A1 | 9/2018 | Sun et al. |
| 2019/0187635 | A1* | 6/2019 | Fan .................. F24F 11/63 |
| 2019/0221090 | A1 | 7/2019 | Beiser et al. |
| 2020/0034962 | A1 | 1/2020 | Matthew et al. |
| 2022/0122243 | A1 | 4/2022 | Fitzgerald et al. |

FOREIGN PATENT DOCUMENTS

| | | |
|---|---|---|
| CN | 109298993 A | 2/2019 |
| JP | 2004252260 A | 9/2004 |
| JP | 2008032491 A | 2/2008 |
| JP | 2013-030542 A | 2/2013 |
| JP | 2017-215277 A | 12/2017 |
| JP | 2018-120300 A | 8/2018 |
| WO | 2012/088707 A1 | 7/2012 |
| WO | 2014/034273 A1 | 3/2014 |
| WO | WO 2018/156869 A1 | 8/2018 |

OTHER PUBLICATIONS

Taiwanese Office Action dated Aug. 14, 2023, issued in corresponding Taiwanese Patent Application No. 108147061 (11 pages).

Murphey et al., Model-Based Fault Diagnosis in Electric Drives Using Machine Learning, Aug. 9, 2005, University of Michigan-Dearborn,Dearborn,MI,48128, p. 1-15 (Year: 2005).

Wakamatsu et al. Machine Learning-based Methods for Detecting Defects in Glass Substrate from Non-contact Electrical Sensor Data, Jul. 2018, Proceedings of the World Congress on Engineering 2018 vol. , p. 1-6. (Year: 2018).

European Search Report from European Patent Office for European Application No. 19219559.2, Nov. 11, 2021, pp. 1-9.

Jian Bo Yang, et al., "Deep Convolutional Neural Networks on Multichannel Time Series for Human Activity Recognition," Proceedings of the Twenty-Fourth International Joint Conference on Artificial Intelligence (IJCAI 2015), Data Analytics Department, Institute for Infocomm Research, A STAR, Singapore 138632, pp. 3995-4001.

Chinese Office Action for CN Application No. 202010078786.4 dated Dec. 18, 2023, 7 pages.

Japanese Office Action for JP Application No. 2019-226698 dated Dec. 5, 2023, 3 pages.

* cited by examiner

SYSTEM AND METHOD FOR GENERATING MACHINE LEARNING MODEL WITH TRACE DATA

CROSS-REFERENCE TO RELATED APPLICATION(S)

This application is a continuation of U.S. patent application Ser. No. 16/403,381, filed on May 3, 2019, which claims the benefits of and priority to U.S. Provisional patent application Ser. No. 62/801,393 filed Feb. 5, 2019, the disclosures of which are incorporated herein by reference in their entireties.

TECHNICAL FIELD

The present disclosure relates generally to machine learning, more particularly, a system and method for generating a machine learning model with trace data. The machine learning model may be used to detect or predict faulty conditions and defects of various electronic devices such as a display panel using sensor data obtained in their manufacturing processes.

BACKGROUND

In recent years, the mobile display industry has grown rapidly. As new types of display panel modules and manufacturing methods and processes are being deployed, and the product specifications are tightened, enhanced equipment and quality control schemes are needed and deployed to maintain the quality of production. Quality control measures can offer early fault detection, abnormal process status prediction, and quality fault prediction.

To understand a nature of fault conditions in a display panel manufacturing process, trace data analysis may be performed. Trace data can be defined as records of activity undertaken through an information system. A trace is a mark left as a sign of a condition and/or passage, and it is recorded as an evidence that an event of interest (e.g., a defect) has occurred in the process. For trace data, the information system may act as a data collection and analysis tool.

There is a need for implementing and running a classifier to detect faulty panels using trace data gathered during the manufacturing processes. The trace data must include information to detect or predict a faulty condition. Currently, trace data is merely a collection of sensor inputs from various manufacturing processes. These trace data may have enough information to detect or predict faulty conditions that may cause or correlate to defects on display panels.

SUMMARY

According to one embodiment, a method includes: receiving a plurality of time-series sensor data obtained in one or more manufacturing processes of an electronic device; arranging the plurality of time-series sensor data in a two-dimensional (2D) data array; providing the 2D data array to a convolutional neural network model; identifying a pattern in the 2D data array that correlates to a fault condition using the convolutional neural network model; providing a fault indicator of the fault condition in the one or more manufacturing processes of the electronic device; and determining that the electronic device includes a fault based on the fault indicator. The 2D data array has a dimension of an input data to the convolutional neural network model.

According to another embodiment, a method includes: providing a convolutional neural network model that is pre-trained with a first set of data having a first format; receiving a second set of data having a second format; converting the second format of the second set of data to the first format and generating a third set of data; re-training the convolutional neural network model with the third set of data; and obtaining an updated convolutional neural network model.

According to another embodiment, an apparatus includes: a processor; and a memory for storing processor-executable instruction, wherein the processor is configured to run a data analytic model, and wherein the data analytic model includes a data preprocessing module and a classifier, wherein the data preprocessing module is configured to: receive a plurality of time-series sensor data obtained in one or more manufacturing processes of an electronic device; arrange the plurality of time-series sensor data in a two-dimensional (2D) data array, and wherein the classifier is configured to: identify a pattern in the 2D data array that correlates to a fault condition; and provide a fault indicator of the fault condition in the one or more manufacturing processes of the electronic device; and determine that the electronic device includes a fault based on the fault indicator.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to

DETAILED DESCRIPTION

Figure 1:
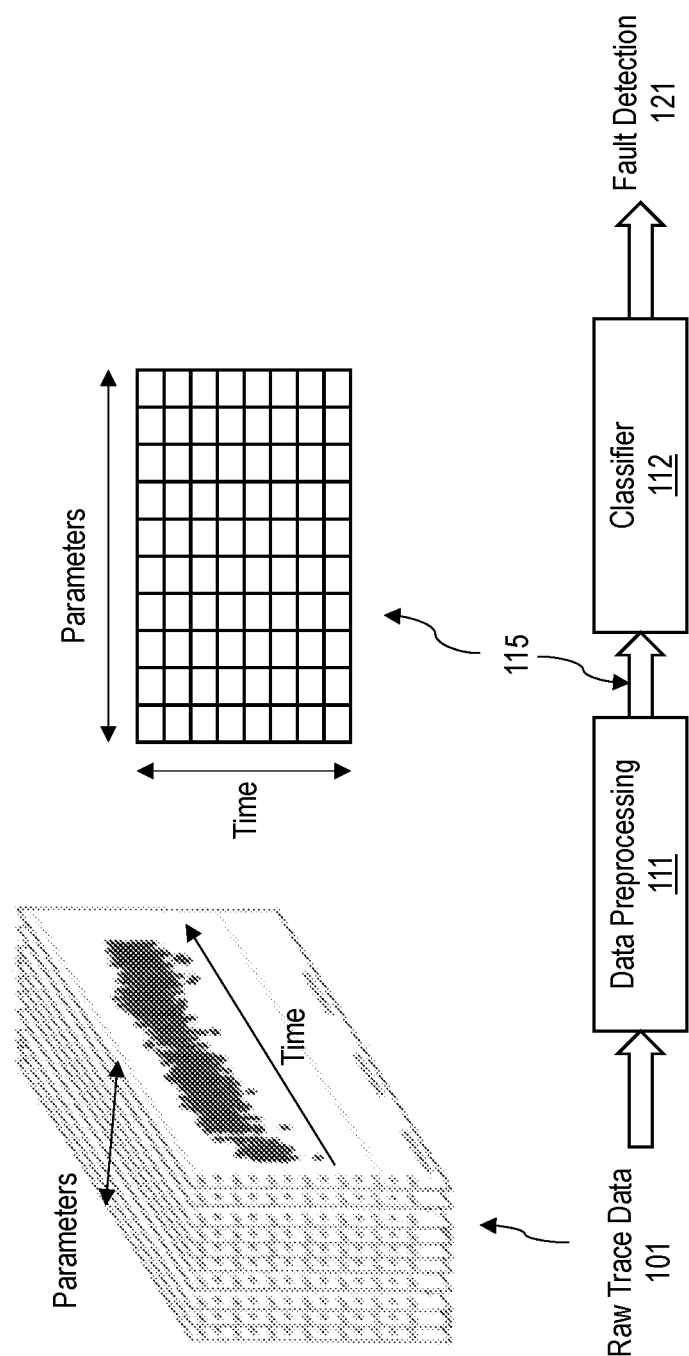
FIG. 1 shows an exemplary process for converting raw trace data, according to one embodiment.

Each of the features and teachings disclosed herein can be utilized separately or in conjunction with other features and teachings to provide a system and method for converting trace data to a format adequate as an input to a data analytic model and detecting and/or predicting faulty conditions or defects of display panels in a manufacturing process using the converted trace data. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present system and method provides a data conversion scheme for converting one-dimensional time-series data (hereinafter also referred to as trace data or raw trace data) to a data format that appropriate as an input data to a data analytic tool. The data analytic tool may be a hardware computing device including a processor and a memory or a software implemented in the hardware computing device. The data analytic tool may run a data analytic model to apply a data classifying algorithm that can identify or predict patterns of the input data. Such data classifying algorithm may be generally referred to as machine learning (ML) algorithm as it is capable of being trained, learned, and refined with more data. Examples of machine learning algorithms include but are not limited to a deep neural network (DNN) and a convolution neural network (CNN). The CNN is a type of the DNN but includes one or more convolutional layers for applying a convolution operation to the input and passing the result to the next layer. The convolution emulates a response of a human neuron to visual or aural stimuli. CNN has been shown to achieve high accuracy on human recognition tasks such as image and speech recognition.

The converted data can be fed to the data analytic model, for example, a CNN model, to detect and/or predict various fault conditions or defects that may occur or may have occurred during a manufacturing process of an electronic device. An example of such electronic device is a display device that is manufactured by steps of semiconductor fabrication processes including deposition, removal, etching, patterning, etc. However, it is noted that any electronic device that is manufactured in semiconductor fabrication processes may be benefitted by the present system and method.

Detection of patterns that correlates to anomalies, failures, faults, and defects using the data analytic model and classification thereof based on the detected patterns can lead to an early determination of fault conditions or detects so that faulty and defective electronic devices can be rejected or discarded during the manufacturing processes. The fault detection processes may be performed in each of the manufacturing processes. In this case, an electronic device that is determined to include a non-repairable fault can be discarded prior to moving to the next manufacturing process. The early detection of a fault condition during the manufacturing processes can save resources and cost to manufacture the electronic device. Further, the data analytic tool can provide help fine-tuning parameters and conditions of the manufacturing processes that can lead to less failure and defects while achieving higher yields.

The raw trace data may be a collection of time-series data that represent pressure, temperature, time, density, etc. that are generated by various sensors and reflect conditions and parameters of the manufacturing processes. Because the raw trace data is merely a collection of time-series one-dimensional data, and the size, range, and units of the raw trace data may vary depending on the types of sensors, and the range of the sensing values.

The raw trace data may not be in a format that is adequate as an input to a data analytic tool. Furthermore, the raw trace data may not have a sufficient number of data samples for the purpose of training and fitting into a reliable data analytic model that can reliably predict fault conditions or defects of the electronic device.

According to one embodiment, the present system and method provides a novel way of converting raw trace data to a data format that is adequate as an input to a data analytic tool. The data analytic tool can provide predictable and reliable classification in predicting and detecting fault conditions and defects.

According to one embodiment, the converted trace data may be fed to a standard data analytic model that is pre-trained using a sufficient number of data samples. The data samples that are used for training may not necessarily be trace data but can yet serve as data samples for the purpose of training raw trace data with a limited number of data samples and classifying patterns to detect and predict fault and defect patterns of the converted trace data. Typically, raw trace data obtained from sensors in a manufacturing system of an electronic device may provide only a limited number of data samples that may not be sufficient that can yield predictable, repeatable, and reliable pattern recognition and classification of patterns using machine learning (ML), deep neural network (DNN), and/or convolution neural network (CNN). The trace data that is converted according to the present system and method can be fed to a data analytic tool to obtain meaningful or useful results that may be otherwise impossible to obtain using the raw trace data.

The present system and method can improve the classification performance of the data analytic model by one or more of processes including, but not limited to, 1) mapping longer sensor input data to 2D data, 2) mapping step input data into a same area of data, 3) merging sensor input as a feature map, and 4) rearranging an order of sensor input data.

According to one embodiment, the present system and method receives and converts multiple one-dimensional time series trace data to two-dimensional (2D) data to utilize display panel manufacturing trace data with an image-based deep machine learning (ML) algorithm. In particular, the present system and method provides a data conversion scheme to convert the trace data to 2D data to improve the performance of pattern recognition and pattern classification to yield meaningful, reliable, and predictable results.

The present disclosure also provides a method for analyzing raw trace data using a machine learning (especially deep learning) algorithm after converting the raw trace data to a data format that is optimized for machine learning.

FIG. 1 shows an exemplary process for converting raw trace data, according to one embodiment. A data conversion system 100 includes a data preprocessing module 111 and a classifier 112. The data preprocessing module 111 receives and converts a raw trace data 101 to a preprocessed trace data 115 and provides the preprocessed trace data 115 to the classifier 112.

According to one embodiment, each of the data preprocessing module 111 and the classifier 112 may include a respective data processing unit and/or a processor, and a memory to perform data preprocessing and pattern recognition and classification, respectively. In another embodiment, the data preprocessing module 111 and the classifier 112 may share a single processor of a computing device and run different threads using different processor cores of a single multi-core processor.

The raw trace data 101 may be a collection of time-series data that may be obtained from various sensors in a manufacturing process of an electronic device (e.g., a glass panel of a display device). Data obtained from each sensor is herein also referred to as a parameter. For a single glass panel, there may be a plurality of parameters obtained during the manufacturing process of the glass panel. However, the raw trace data 101 may also refer to a collection of data obtained from more than one glass panels or a partial data obtained from a single glass panel. The format, length, unit, and/or ranges of the raw trace data 101 may vary depending the deviation of the glass panels (e.g., size, resolution, types of the glass panels) as well as the manufacturing processes. For the same size glass panel manufactured by the same processes, the deviation of the raw trace data 101 may be merely a size. For example, one set of the raw trace data 101 may be longer than another set of raw trace data 101 if the processing time of the glass panels may be different from each other.

The data preprocessing module 111 converts the raw trace data 101 to the preprocessed trace data 115 in a normalized format so that it can be input to the classifier 112. For example, the raw trace data 101 is one-dimensional time-series data of multiple parameters, and the preprocessed trace data 115 is a two-dimensional (2D) image-like data. The 2D image-like data has a first dimension that corresponds to the parameters and a second dimension that corresponds to data samples in time. The first and second dimensions correspond to X and Y coordinates of the 2D image-like data.

One of the primary tasks of the data preprocessing module 111 is to convert each set of the raw trace data 101 to the preprocessed trace data 115 that has a uniform size having the same size and dimension so that the classifier 112 can recognize patterns that can correlate to faults or defects and classify them accordingly. The data preprocessing module 111 may further normalize the 2D image-lie data to shift an average value of the data in the middle and change a scale and/or resolution of the data. Other data preprocessing schemes that can be applied to the raw trace data 101 will be discuss below in further detail.

The classifier 112 receives the preprocessed trace data 115 from the data preprocessing module 111 and performs pattern recognition and classification thereon and generates an output data herein referred to as fault detection results 121. The fault detection results 121 may indicate that the raw trace data 101 merely includes a pattern of a fault (e.g., fault or no fault). In some embodiments, the fault detection results 121 may indicate a probability that the corresponding glass panel includes a fault in a predetermined range, for example, 0 (no fault) to 100 (definitively including a fault). In other embodiments, the output data may include further details regarding the classification of the fault detection results 121, for example, a type of a fault (e.g., a dry etching process defect, a window defect, a Mura defect, a particle defect, etc.) and/or a location of the fault. The detailed information of the faults or defects may be used to identify the nature of the faults or defects to fine tune the manufacturing processes or even repair them using a repair tool if the faults or defects are repairable.

The preprocessed trace data 115 that the data preprocessing module 111 generates is in a format that is adequate for applying a deep learning algorithm by the classifier 112. The preprocessed trace data 115 that is optimized for the classifier 112 may increase the performance of identification and classification of fault detection. For example, the classifier 112 may use a deep neural network (DNN) for identifying patterns or features of a 2D image. In the present example, such patterns may be correlated to anomalies, faults, and defects that may occur in a manufacturing process of an electronic device (e.g., a glass panel of a display device). In some embodiments, the classifier 112 may identify a specific pattern in the raw trace data 101 that may eventually lead to or may tend to lead to the anomalies, faults, and/or defects.

The DNN algorithm that the classifier 112 runs may be specifically tailored for identifying patterns of 2D image data, for example, face recognition, character recognition from image data or speech recognition from voice data. The DNN algorithm may use a data model that is pre-trained, pre-tested, and pre-validated with a sufficient number of data samples. In general, a data model that is trained, tested, and validated with a large set of data (e.g., hundreds of thousands) may yield reliable and repeatable results. However, the data samples that are used to train, test, and validate the DNN algorithm may not necessarily be trace data of a target application. As discussed earlier, one of the target applications of the present system and method is fault pattern detection of a glass panel of a display device using sensor data that is obtained during the manufacturing processes. The number of sensor data samples may not be sufficient to train, test, and validate the data model, therefore, a data model that is pre-trained, pre-tested, and pre-validated with different data sets may be used, but it can still generate reliable and repeatable results. Great classification results are expected if the data preprocessing module 111 performs the data processing by resizing, mapping, merging, and rearranging as will be discussed below in further details. Examples of the standard data models may include, but are not limited to, Caffe, VGG, ResNet, Alexnet, and Squeezenet.

According to one embodiment, the classifier 112 uses a 2D image-based convolution neural network (CNN). The data model may receive various types of data formats. For example, the data model may receive a 2D integer-based data or a 2D floating point data. When the data model receives a 2D floating point data, the original resolution of the input data (e.g., trace data) may be preserved. When applicable, the data preprocessing module 111 may convert a 2D integer-based image data to a 2D floating point data and normalizes the data as an input to the CNN. The classifier 112 receives the normalized sensor input data in a 2D floating point format and may identify fault patterns based on the normalized 2D floating point sensor input data.

According to one embodiment, the data preprocessing module 111 converts the raw trace data 101 by minimizing information loss while enhancing the classification performance. Using the preprocessed trace data 115 that is specifically formatted and optimized for the classifier 112, classification results of the raw trace data 101 by the classifier 112 can be greatly improved. The classification results by the classifier 112 may be validated using various cross-validation schemes to characterize the performance of the classification and update the data preprocessing. For example, the DNN or CNN algorithm of the classifier 112 may be validated over k-fold cross-validation to provide higher and consistent classification accuracy.

Figure 2:
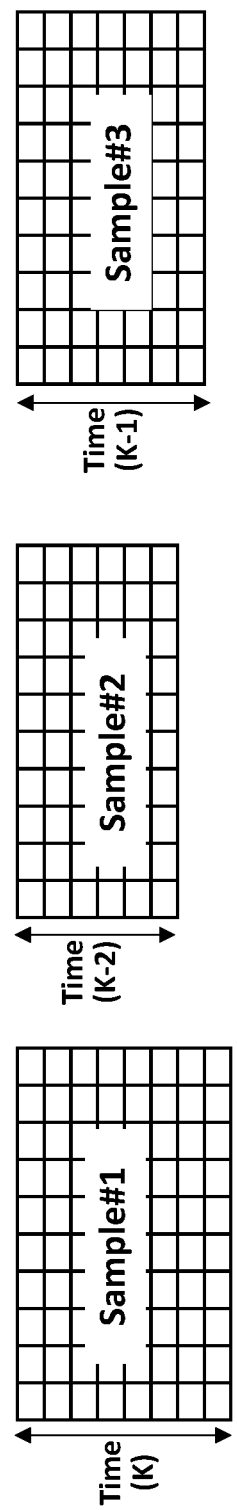
FIG. 2 shows three samples of data conversion from numerical data to 2D image-like data.

FIG. 2 shows three samples of data conversion from numerical data to 2D image-like data. Each sample of a raw trace data (e.g., the raw trace data 101 of FIG. 1) may have different dimensions and/or sizes. For example, each sample can have different sampling time intervals and/or processing times. In the present example, Sample #1 includes a time series of K samples (in the y-dimension) whereas Sample #2 includes (K−2) samples, and Sample #3 includes (K−1) samples. Although it is not explicitly shown in FIG. 2, each sample may have different number parameters in the x-dimension as well. If a time-series numerical data is converted into 2D image-like data, the size for each data sample can vary as the dimensions and/or sizes of the raw trace data vary.

Figure 3:
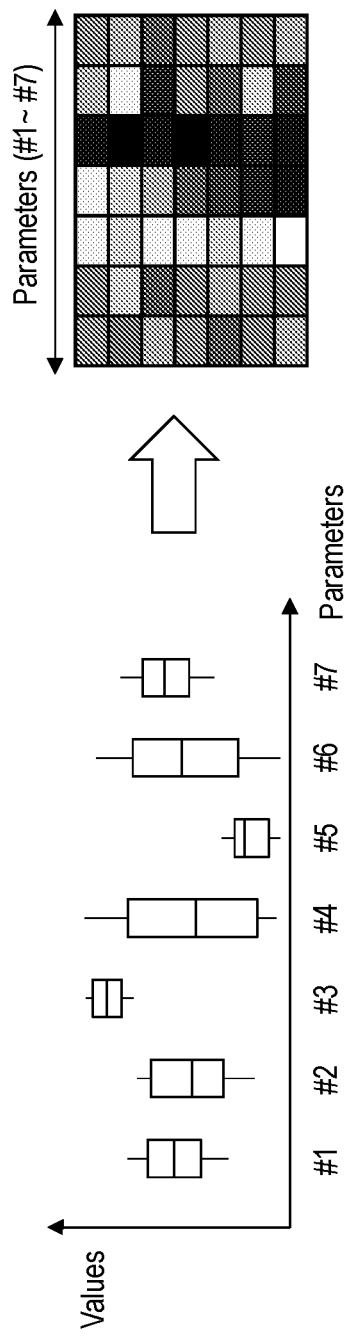
FIG. 3 shows an example process of merging sensor inputs, according to one embodiment.

FIG. 3 shows an example process of merging sensor inputs, according to one embodiment. Each parameter #1 to #7 has different variance. A range of each parameter is indicated as a box plot, and an average is indicated as a line in the box plot for each data sample. The average value of each parameter may deviate from a median value. In the present example, each parameter is shown to include the same number of data samples. The parameters may be arranged in the x-dimension, and their data samples of time-series data may be arranged in the y-dimension to obtain a 2D data. For the purpose of illustration, data values are represented by a gray scale of the 2D data. When the raw trace data is converted to the 2D data, parameters with a low variance, for example, data samples #3 and #5, may not be easily recognized as a defect because the range of data values is small, hence the range of defective values.

Figure 4:
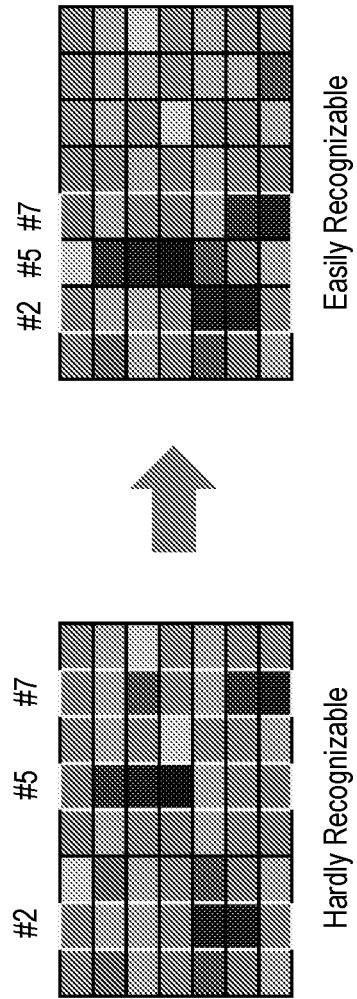
FIG. 4 shows an example process of rearranging an order of input data, according to one embodiment.

FIG. 4 shows an example process of rearranging an order of an input data, according to one embodiment. Data corresponding to parameters #2, #5, and #7 are separated from each other, and they may be closely correlated to a particular type of defects. When the parameters #2, #5, and #7 are separated or spread out from each other, the particular type of defects may not be easily recognizable. In general, defects that may correlate to one or more of these parameters may be more easily recognizable when those parameters are placed to be closer to each other in the input data. In this case, the order of input data may be rearranged to enhance a pattern-detection performance by the classifier. In the present example, the data corresponding to parameters #2, #5, and #7 are placed in the vicinity of each other to improve the performance of fault pattern detection. Reordering of the input data may be done in various ways, for example, based on a range, an average value, a median value, an amount of deviation of data values for each parameter and characteristics of the data. In some embodiments, covariance or correlation matrix may be used in determining a correlation among parameters and reordering the parameters in the input data. It is understood, however, that other parameters may be used to reorder the input data without deviating from the scope of the present disclosure.

According to one embodiment, the present system and method provides an efficient way of generating 2D image-like data samples from raw trace data that are obtained during a manufacturing process. The 2D input data to the classifier may be generated by a series of training, testing, and validation processes by varying settings for the data preprocessing. Examples of the data preprocessing include, but are not limited to, adjusting a data length, scaling different sensor inputs, and rearranging an order of input data from a raw trace dataset.

A total processing time for a glass panel may include multiple unit-processing step times. Each processing step may have a different processing timing, and each processing step does not always guarantee that the size of the raw trace data is the same. In the case of a glass panel, the data preprocessing unit 111 adjusts the total data size of each glass panel to have the preprocessed 2D data to have a uniform size irrespective of the variation of the respective processing step times. This process is herein referred to as data length adjustment. The data length adjustment matches the number of total sensor inputs (e.g., the number of data size in x-dimension) and the number of data samples (e.g., the number of data size in y-dimension). Referring back to FIG. 1, the data preprocessing unit 111 performs the data length adjustment to adjust the size of the raw trace data 101. More specifically, the data preprocessing unit 111 generates 2D data having a uniform size from the time-series raw trace data that may have different sizes.

To provide an optimal and best performance settings for converting the raw trace data 101 to a 2D data to input to the classifier 112, the data preprocessing module 111 may perform one or more of resizing, mapping, merging, and rearranging the raw trace data 101. Some of these data preprocessing may be necessary while others may be conditional and/or optional. Depending on the characteristics of the data being applied and results of the classification performance, these data preprocessing steps may be continuously validated and updated over the real data samples to further improved the performance of the classifier 112.

Figure 5:
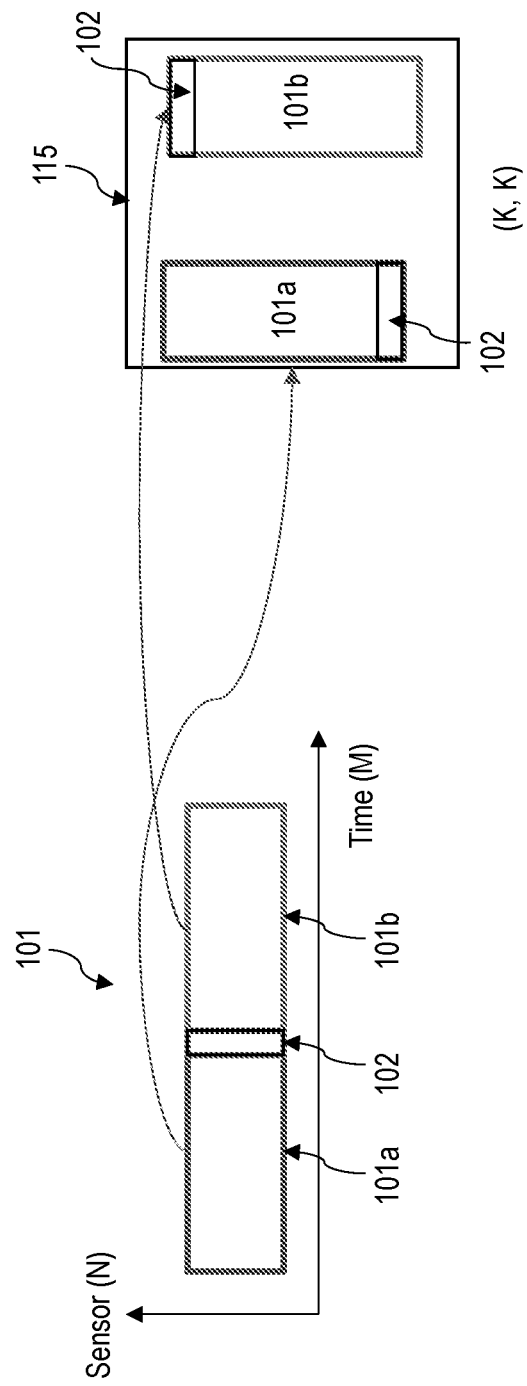
FIG. 5 shows an example mapping of longer sensor input data to 2D image-like data, according to one embodiment.

FIG. 5 shows an example mapping of longer sensor input data to 2D image-like data, according to one embodiment. Suppose that the raw trace data 101 has M sampling points and N sensor inputs (or parameters). The raw trace data 101 is initially arranged in a first 2D array (M, 1V). The classifier 112, however, may be configured to receive a 2D image-like preprocessed trace data 115 having a second 2D array (K, K). In the present example, the number of rows and columns K of the 2D image-like data is the same; however, it is noted that this is only an example, and the present disclosure is not limited thereto, and any number of rows and columns may be used without deviating from the scope of the present disclosure. For the convenience of the explanation, the following description is based on a case in which the numbers of rows and columns of the 2D data are the same, i.e., K.

If the number of sampling points M in the raw trace data 101 is larger than the size K of the preprocessed trace data 115 to be input to the classifier 112, i.e., M>K, the data preprocessing unit 111 performs the data length adjustment by resizing the (M, N) array to fit into the (K, K) array. For example, the raw trace data 101 is split into a plurality of pieces 101a and 101b. In doing so, an overlapped area 102 that provides convolution with prior and post data may be commonly included in each piece of the split datasets 101a and 101b. After splitting the raw trace data 101 into two pieces, the split datasets 101a and 101b are placed inside the (K, K) array. To maintain the continuity of the data, each split dataset may include an overlapped area. After the raw trace data 101 is split into the split datasets 101a and 101b (including the overlapped area 102) to fit into the (K, K) array, the split datasets 101a and 101b may be initially placed at random positions within the (K, K) array. When placing the split datasets 101a and 101b, they may be rotated and separated from each other. Vacant areas of the (K, K) array after placing the split datasets 101a and 101b may be filled with some numbers, for example, zero. The filling numbers may vary depending on the type, range and format of the data. Once the positions of the split datasets 101a and 101b within the (K, K) array are determined, the subsequent raw trace data must be split in the same way and placed at the same positions to obtain consistent classification results.

According to one embodiment, the minimum size of the overlapped area is determined based on a convolution window size of the first layer of the CNN. For an example of 5×5 convolution window in the first layer of CNN, the overlapped area is set to be greater than 5.

The manufacturing process of a glass panel may include multiple steps L. Each step may have a different data length even if it does not deviate much from an average processing time, and each step may have even variance in a processing time.

Figure 6:
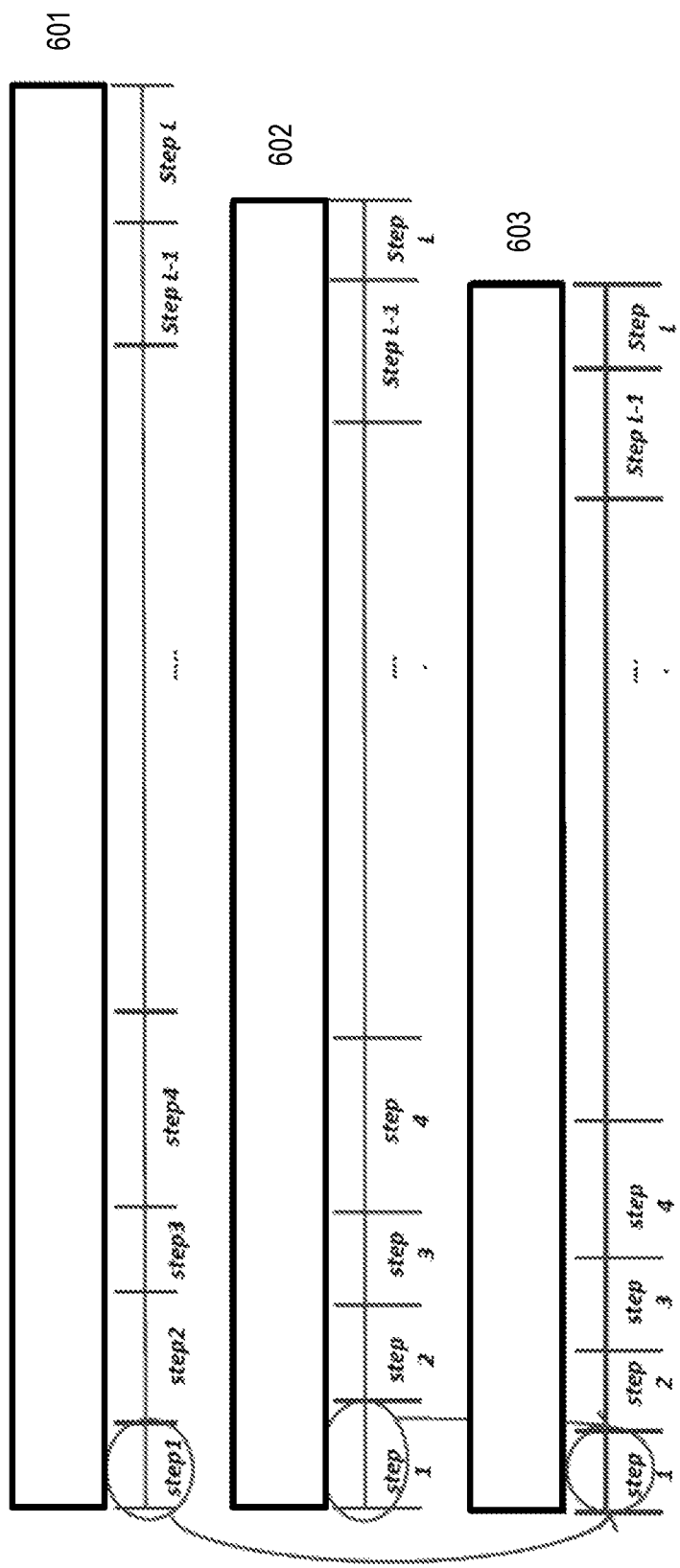
FIG. 6 shows an example of mapping step input data into a same area of data, according to one embodiment.

FIG. 6 shows an example of mapping step input data into a same area of data, according to one embodiment. Raw data 601 and 602 have the same number of processing steps, namely, step 1 to step L. The size of step 1 of the raw data 602 is greater than that of raw data 601. In a case where step sizes of the same step in different raw data are different, the raw data needs to be mapped to place the same data at the same location in a resized raw data 603. It is tested and validated that the best classification performance can be achieved when same step data is fed into the same location in the 2D data. To place the same data at the same location, each step size may be mapped to a minimum size of each step. Resizing and mapping the same data at the same location, a minimum size of a step can be determined based on the smallest step size. In the present example, the size of step 1 in the resized raw data 603 is determined to be the size of the step 1 in the raw data 601 that is smaller than the size of step 1 in the raw data 602. Generalizing the resizing and mapping of the raw data, the raw data may be merely cut short to have the required size. For example, 20 samples included in step 1 of the raw data 602 may be shorted to 15 data samples taking the first 15 data samples. In another example, the raw data may be resampled with decimation to obtain the required size in each step. The same resizing and mapping procedures may repeat for the remaining step 2 to step L to obtain the resized raw data 603.

According to one embodiment, each sensor inputs may be merged into a common data sample from a range of (min, max) to (−1,1) to normalize the raw trace data. The normalized data within a bound of −1 and 1 may suppress the differences between the raw trace data that may have a wide deviation.

Figure 7:
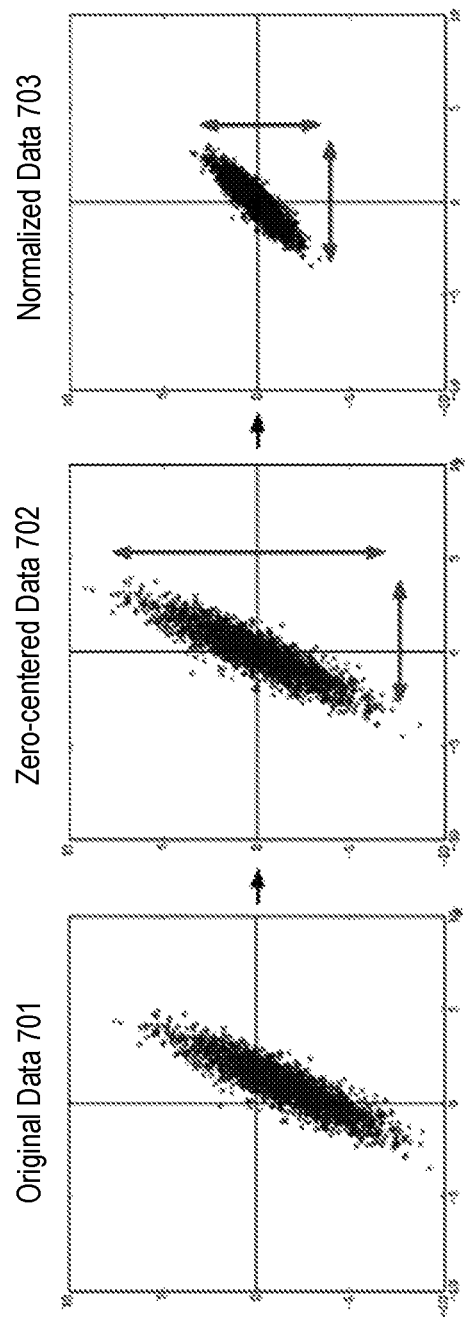
FIG. 7 shows an example merging of sensor input as a feature map, according to one embodiment.

FIG. 7 shows an example merging of sensor input as a feature map, according to one embodiment. An original data 701 is zero-centered to place the average in both X and Y values at zero, and the zero-centered data 702 is normalized to generate the normalized data 703 to fit the data in (−1, 1).

A total of N sensor inputs or raw trace data may be merged as a feature map. In one embodiment, a min-max value is used to normalize the data; x−min(x)/max(x)−min (x), x being a sensor data. In another embodiment, a standardized normalization is used; x−mean(x)/std.(x).

Figure 8:
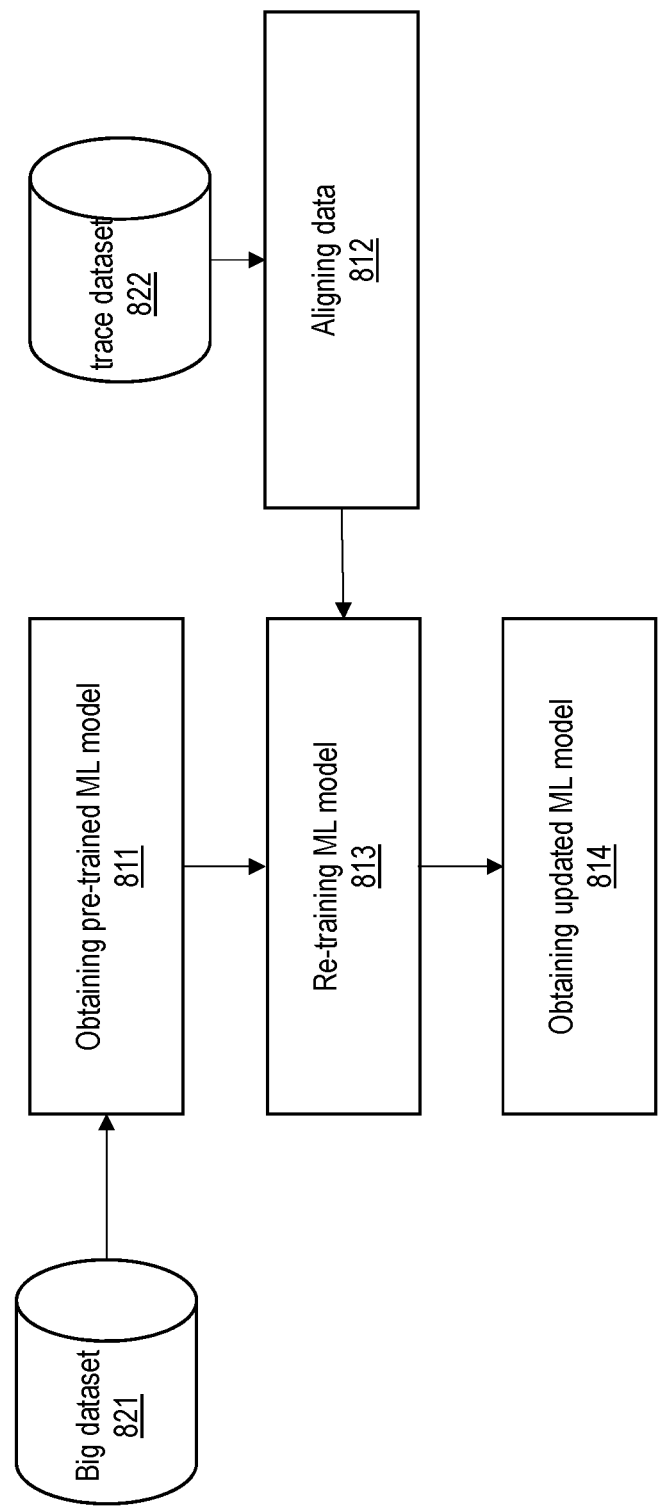
FIG. 8 show a schematic diagram for obtaining a machine learning model, according to one embodiment.

FIG. 8 show a schematic diagram for obtaining a machine learning model, according to one embodiment. In one embodiment, the machine learning model may refer to a convolutional neural network model. First, a machine learning model is obtained (811). The machine learning model that is pre-trained with big dataset 821 may be used. The big dataset that is used to pre-train the machine learning model may not be trace data representing sensor inputs that will be later input to the machine learning model. In this case, the machine learning model may be pre-trained using other source data such as ImageNet, Microsoft Common Object in Context (COCO), and PASCAL visual object classes (VOC), or the like. According to another embodiment, the machine learning model may be obtained by pre-training with a set of trace data that is sufficiently large enough to yield reliable and predictable results specifically targeted for a fault detection application as discussed above. Regardless of the type of data used to pre-train the machine learning model, the machine learning model may achieve reliable, repeatable fault pattern classification and prediction results after re-training with trace data, which will be performed in the next step.

After the pre-trained machine learning model is obtained, the pre-trained machine learning model is re-trained with trace dataset 822 for re-training and inference. The trace dataset 822 may also be referred to as topological data analysis (TDA) dataset including sensor data for a specific target application. The trace dataset 822 is aligned to convert its format to a format that is adequate as an input to the machine learning model (812), and the aligned trace data is applied to the machine learning model for re-training (813). The re-training process may require iterations with a number of trace dataset 822 until a pre-determined condition is met. For example, the re-training process may be completed when pre-defined precision, recall, and/or accuracy are(is) achieved. In some cases, the re-training process is completed when a mean-average precision is achieved. After re-training the machine learning model, network coefficients of the machine learning model may be updated for the trace dataset, and an updated machine learning model is obtained (814) that is ready for the target application for classifying and predicting fault patterns.

The trace dataset 822 may or may not be a part of a large dataset that is used to pre-trained the machine learning model. In some cases, the big dataset 821 that is used to pre-train the machine learning model may be purely those source data such as ImageNet, Microsoft Common Object in Context (COCO), and PASCAL visual object classes (VOC). In other cases, the big dataset 821 may include the trace dataset 822 as a part of the source data that is used to pre-train the machine learning model. The re-training process of the machine learning model is important to transfer learned knowledge from the trace data, particularly when the machine learning model is pre-trained with source data that is different from the trace data. In doing so, one or more internal layers of the machine learning model (e.g., softmax layer, fully connected (FC) layer) may be updated to reflect the difference of the classes that are recognizable and classifiable with the machine learning model. For example, the machine learning model that is pre-trained with ImageNet is trained with 465, 567 images and validated with 20, 121 images, and it can identify 200 different classes including guacamole, neck brace, iPod, chime, etc. The machine learning model that is re-trained with a number of the trace dataset 822 may be able to identify different number and types of classes, for example, a dry etching process defect, a window defect, a Mura defect, a particle defect, or the like. The trace dataset 822 may be updated with new trace data, and the machine learning model may be re-trained again to refine the accuracy of classification and fault pattern recognition.

Figure 9:
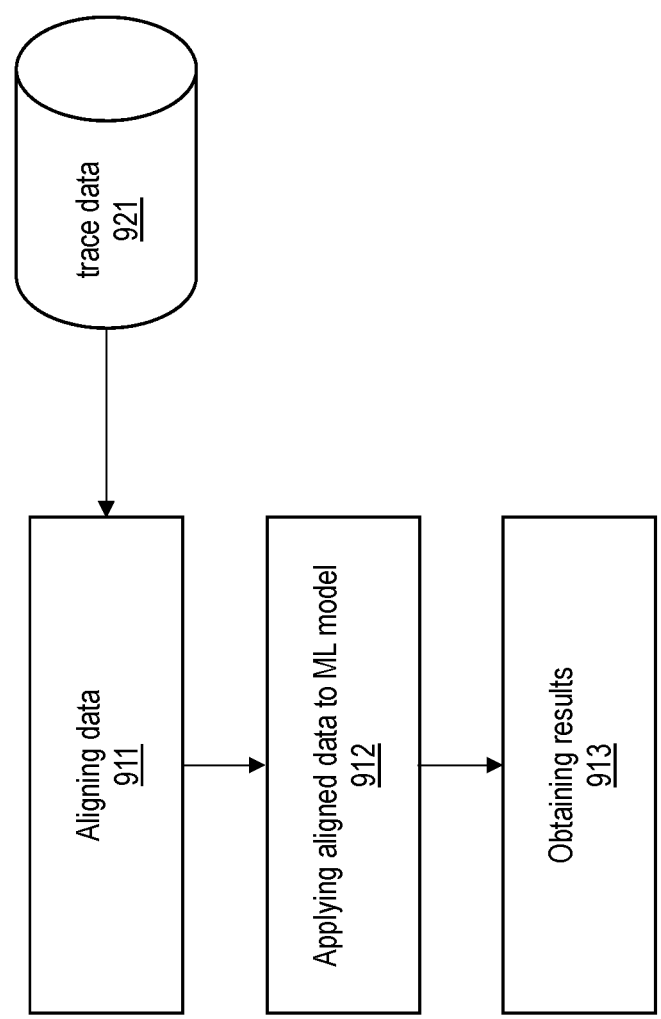
FIG. 9 shows schematic diagram for applying trace data to a machine learning model to obtain a prediction result, according to one embodiment.

FIG. 9 shows schematic diagram for applying trace data to a machine learning model to obtain a prediction result, according to one embodiment. It is assumed that the machine learning model is trained with trace dataset as described above with reference to FIG. 8. A trace data 921 is aligned (911) including resizing, mapping, merging, and rearranging the trace data 921. For example, the trace data 921 may be converted to an input format appropriate for the machine learning model. The aligned trace data is then applied to the machine learning model (912). The machine learning model can obtain classification results and predict patterns that may be associated with a plurality of classes of faults (913).

The trace data 921 may include sensor data that is obtained during a manufacturing process of an electronic device such as a display panel. The trace data 921 may be converted and handled such as a 2D image data during the process of data alignment (911) as discussed above with reference to FIGS. 3-6 and fed to the machine learning model. The machine learning model may be continuously updated and re-trained to refine the accuracy and fault detection and prediction results. The updating and refining of the machine learning model may be performed as the fault pattern detection and prediction results are generated. Alternatively, the fault pattern detection and prediction results of the machine learning model may be correlated with the real fault data, and the machine learning model may be updated along with the correlation result to further improve the accuracy and fault detection and prediction capability of the machine learning model.

According to one embodiment, an order of the raw trace data 101 may be rearranged according to input data correlations to help machine learning to learn easily. Referring to FIG. 3, correlated data are placed close to each other so that patterns are easily recognizable in an input dataset.

The raw trace data may be rearranged in various other ways. For example, the raw trace data may be rearranged by placing high variance data input to a center of input data to catch a pattern of a high activity. In another example, high covariance items are placed close to each other in the rearranged data by placing similar patterns of the raw trace data close to each other.

The above-described data preprocessing including resizing, mapping, merging, and rearranging can be used in any combination to generate the preprocessed trace data 115. All of these data preprocessing may be done before starting machine learning training, testing, and/or validation. Same rules may apply to all dataset including future dataset under the assumption of the future data would have the same distribution with the current dataset.

The present system and method provides a technique for converting multiple one-dimensional time series input to 2D image-like data to apply transfer learning from other DNNs. The present system and method provides a formal way to convert one-dimensional multiple time series input to 2D data that works well with existing DNN architecture.

The present disclosure can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

According to one embodiment, a method includes: receiving a plurality of time-series sensor data obtained in one or more manufacturing processes of an electronic device; arranging the plurality of time-series sensor data in a two-dimensional (2D) data array; providing the 2D data array to a convolutional neural network model; identifying a pattern in the 2D data array that correlates to a fault condition using the convolutional neural network model; providing a fault indicator of the fault condition in the one or more manufacturing processes of the electronic device; and determining that the electronic device includes a fault based on the fault indicator. The 2D data array has a dimension of an input data to the convolutional neural network model.

The electronic device may be a display device.

The electronic device may be a glass panel of a display device.

The convolutional neural network model may be VGG, Resnet, Alexnet, or Squeezenet.

The results of the classification may include a type and a location of the fault condition.

The plurality of data arrays may be separated from each other within the second 2D data array.

The method may further include: discarding the electronic device that includes the fault during the one or more of the manufacturing processes.

The method may further include: placing the plurality of time-series sensor data into a raw trace data array having a first dimension corresponding to a number of sensors and a second dimension corresponding to a number of data samples for each of the sensors; determining whether the raw trace data array fits into the 2D data array; splitting the raw trace data array into a plurality of raw trace data arrays; and placing the plurality of raw trace data arrays into the 2D data array.

Each of the plurality of raw trace data arrays may include an overlap area.

The method may further include: receiving a plurality of time-series sensor data sets having different numbers of data samples; determining a time-series sensor data set among the plurality of time-series sensor data sets that has a minimal number of data samples; and resizing remaining sensor time-series data sets of the plurality of time-series sensor data sets to have the minimal number of data samples.

The method may further include: determining a subset of the plurality of time-series sensor data that correlate to the fault condition; and rearranging the 2D data array to place the subset of plurality of time-series sensor data in a vicinity to each other.

The method may further include: receiving a plurality of time-series sensor data sets, wherein each of the plurality of time-series sensor data sets includes data corresponding to a plurality of processing steps in the one or more manufacturing processes; comparing data sizes of each of the plurality of processing steps in the plurality of time-series sensor data sets; for each processing step of the plurality of processing steps, determining a time-series sensor data set among the plurality of time-series sensor data sets that has a minimal step size; mapping time-series sensor data corresponding to a respective process step in remaining time-series sensor data sets to have the minimal step size; and generating the 2D data array for each of the plurality of time-series sensor data sets by combining respective process steps that are mapped to the minimal step size.

The method may further include: selecting first data samples of the minimal step size when mapping the time-series sensor data.

The method may further include: resampling the time-series sensor data with decimation to obtain a resampled time-series sensor data having the minimal step size.

The method may further include: determining an average of the plurality of time-series sensor data; shifting each of the plurality of time-series sensor data to place the average at a zero; and normalizing each of the plurality of time-series sensor data within a range between −1 and +1.

According to another embodiment, a method includes: providing a convolutional neural network model that is pre-trained with a first set of data having a first format; receiving a second set of data having a second format; converting the second format of the second set of data to the first format and generating a third set of data; re-training the convolutional neural network model with the third set of data; and obtaining an updated convolutional neural network model.

The second set of data may be a plurality of time-series sensor data obtained in one or more manufacturing processes of an electronic device, and the first format is a two-dimensional (2D) data array. The method may further include: providing the third set of data having the first format of the 2D data array to the updated convolutional neural network model; identifying a pattern in the 2D data array that correlates to a fault condition using the updated convolutional neural network model; providing a fault indicator of the fault condition in the one or more manufacturing processes of the electronic device; and determining that the electronic device includes a fault based on the fault indicator. The 2D data array has a dimension of an input data to the updated convolutional neural network model. The method may further include at least one of: 1) placing the plurality of time-series sensor data into a raw trace data array having a first dimension corresponding to a number of sensors and a second dimension corresponding to a number of data samples for each of the sensors; determining whether the raw trace data array fits into the 2D data array; splitting the raw trace data array into a plurality of raw trace data arrays; and placing the plurality of raw trace data arrays into the 2D data array; 2) receiving a plurality of time-series sensor data sets having different numbers of data samples; determining a time-series sensor data set among the plurality of time-series sensor data sets that has a minimal number of data samples; and resizing remaining sensor time-series data sets of the plurality of time-series sensor data sets to have the minimal number of data samples; 3) determining a subset of the plurality of time-series sensor data that correlate to the fault condition; and rearranging the 2D data array to place the subset of plurality of time-series sensor data in a vicinity to each other; and 4) receiving a plurality of time-series sensor data sets, wherein each of the plurality of time-series sensor data sets includes data corresponding to a plurality of processing steps in the one or more manufacturing processes; comparing data sizes of each of the plurality of processing steps in the plurality of time-series sensor data sets; for each processing step of the plurality of processing steps, determining a time-series sensor data set among the plurality of time-series sensor data sets that has a minimal step size; mapping time-series sensor data corresponding to a respective process step in remaining time-series sensor data sets to have the minimal step size; and generating the 2D data array for each of the plurality of time-series sensor data sets by combining respective process steps that are mapped to the minimal step size.

The electronic device may be a glass panel of a display device.

The updated convolutional neural network model may be VGG, Resnet, Alexnet, or Squeezenet.

The method may further include: discarding the electronic device that includes the fault during the one or more of the manufacturing processes.

According to another embodiment, an apparatus includes: a processor; and a memory for storing processor-executable instruction, wherein the processor is configured to run a data analytic model, and wherein the data analytic model includes a data preprocessing module and a classifier, wherein the data preprocessing module is configured to: receive a plurality of time-series sensor data obtained in one or more manufacturing processes of an electronic device; arrange the plurality of time-series sensor data in a two-dimensional (2D) data array, and wherein the classifier is configured to: identify a pattern in the 2D data array that correlates to a fault condition; and provide a fault indicator of the fault condition in the one or more manufacturing processes of the electronic device; and determine that the electronic device includes a fault based on the fault indicator.

The above detailed descriptions are provided to illustrate specific embodiments of the present disclosure and are not intended to be limiting. Numerous modifications and variations within the scope of the present disclosure are possible. The present disclosure is defined by the appended claims.

What is claimed is:

1. A method for training a machine learning model using time-series data, the method comprising:
   receiving first time-series sensor data having a first size and a first ordering;
   arranging the first time-series sensor data in a two-dimensional (2D) data array, wherein the arranging includes:
      processing the first time-series sensor data to have a second ordering different from the first ordering by:
         determining a first subset of the first time-series sensor data that correlates to a fault condition in an electronic device; and
         determining a second subset of the first time-series sensor data that correlates to the fault condition, the first subset being different than the second subset; and
      storing the first time-series sensor data in the 2D data array according to the second ordering by rearranging the 2D data array to place the first subset closer to the second subset, such that the fault condition is recognizable; and
   training the machine learning model using the 2D data array to correct the fault condition.

2. The method of claim 1, further comprising:
   receiving second time-series sensor data;
   placing the second time-series sensor data into a raw trace data array having a first dimension corresponding to a number of sensors and a second dimension corresponding to a number of data samples for each of the sensors;
   determining whether the raw trace data array fits into the 2D data array; and
   splitting the raw trace data array into raw trace data arrays.

3. The method of claim 2, further comprising:
   placing the raw trace data arrays into the 2D data array, wherein each of the raw trace data arrays includes an overlap area.

4. The method of claim 1, further comprising:
   receiving second time-series sensor data comprising time-series sensor data sets having different numbers of data samples; and
   processing the second time-series sensor data by:
      determining a time-series sensor data set among the time-series sensor data sets that has a first number of data samples; and
      resizing remaining time-series sensor data sets of the time-series sensor data sets to have the first number of data samples.

5. The method of claim 1, further comprising:
   receiving second time-series sensor data comprising time-series sensor data sets, each of the time-series sensor data sets including data corresponding to processing steps in a process;
   comparing data sizes of each of the processing steps in the time-series sensor data sets;
   for each processing step of the processing steps, determining a time-series sensor data set among the time-series sensor data sets that has a first step size;
   mapping the second time-series sensor data corresponding to a respective process step in remaining time-series sensor data sets to have the first step size; and
   generating the 2D data array for each of the time-series sensor data sets by combining respective process steps that are mapped to the first step size.

6. The method of claim 5, further comprising selecting first data samples of the first step size when mapping the second time-series sensor data.

7. The method of claim 5, further comprising resampling the time-series sensor data with decimation to obtain a resampled time-series sensor data having the first step size.

8. The method of claim 1, further comprising:
   receiving second time-series sensor data;
   determining an average of the second time-series sensor data;
   shifting each of the second time-series sensor data to place the average at a zero; and
   normalizing each of the second time-series sensor data within a range between −1 and +1.

9. The method of claim 1, wherein:
   the first time-series sensor data is obtained in one or more manufacturing processes of devices; and
   the machine learning model is trained to classify the devices based on the first time-series sensor data.

10. A system comprising a processor and a memory storing instructions, wherein the instructions, when executed by the processor, cause the processor to perform:
    receiving first time-series sensor data having a first size and a first ordering;
    arranging the first time-series sensor data in a two-dimensional (2D) data array, wherein the arranging includes:
       processing the first time-series sensor data to have at least one of a second size different from the first size, or to have a second ordering different from the first ordering by:
          placing the first time-series sensor data into a raw trace data array having a first dimension corresponding to a number of sensors and a second dimension corresponding to a number of data samples for each of the sensors; and separating a first portion of the first time-series sensor data from a second portion of the first time-series sensor data to fit the first portion and the second portion in the 2D data array, based on the 2D data array having a third dimension that is different from at least one of the first dimension or the second dimension; and storing the first time-series sensor data in the 2D data array according to at least the second size or the second ordering;

training a machine learning model using the 2D data array; and correcting a fault condition in an electronic device based on an output of the machine learning model.

11. The system of claim 10, wherein the instructions, when executed by the processor, cause the processor to perform:

receiving second time-series sensor data;

determining a subset of the second time-series sensor data that correlate to a fault condition; and rearranging the 2D data array to place the subset of the second time-series sensor data in a vicinity to each other, such that the fault condition is recognizable.

12. The system of claim 10, wherein the instructions, when executed by the processor, cause the processor to perform:

receiving second time-series sensor data comprising time-series sensor data sets having different numbers of data samples;

determining a time-series sensor data set among the time-series sensor data sets that has a first number of data samples; and resizing remaining time-series sensor data sets of the time-series sensor data sets to have the first number of data samples.

13. The system of claim 10, wherein the instructions, when executed by the processor, cause the processor to perform:

receiving second time-series sensor data comprising time-series sensor data sets, each of the time-series sensor data sets including data corresponding to processing steps in a process;

comparing data sizes of each of the processing steps in the time-series sensor data sets;

for each processing step of the processing steps, determining a time-series sensor data set among the time-series sensor data sets that has a first step size;

mapping second time-series sensor data corresponding to a respective process step in remaining time-series sensor data sets to have the first step size; and generating the 2D data array for each of the time-series sensor data sets by combining respective process steps that are mapped to the first step size.

14. The system of claim 13, wherein the instructions, when executed by the processor, cause the processor to perform selecting first data samples of the first step size when mapping the time-series sensor data.

15. The system of claim 10, wherein the instructions, when executed by the processor, cause the processor to:

receiving second time-series sensor data;

determining an average of the second time-series sensor data;

shifting each of the second time-series sensor data to place the average at a zero; and normalizing each of the second time-series sensor data within a range between −1 and +1.

16. The system of claim 10, wherein:

the first time-series sensor data is obtained in one or more manufacturing processes of devices; and the machine learning model is trained to classify the devices based on the first time-series sensor data.

17. A method for training a machine learning model, the method comprising:

receiving time-series sensor data having a first size and a first ordering;

arranging the time-series sensor data in a two-dimensional (2D) data array, wherein the arranging includes:

processing the time-series sensor data to have a second size different from the first size by:

determining a first number of data samples associated with a first step of a first process;

determining a second number of data samples associated with a first step of a second process, the second number of data samples being different from the first number of data samples; and changing the second number of data samples to equal the first number of data samples; and storing the time-series sensor data in a data array according to the second size, the second size corresponding to the second number of data samples being equal to the first number of data samples;

training the machine learning model using the 2D data array; and correcting a fault condition in an electronic device based on an output of the machine learning model.

18. The method of claim 17, wherein the processing further comprises:

comparing the first number of data samples with the second number of data samples; and mapping time-series sensor data corresponding to the first step of the second process to have a first step size associated with the first step of the first process.

19. The method of claim 18, wherein the processing further comprises resampling the time-series sensor data with decimation to obtain a resampled time-series sensor data having the first step size.

20. The method of claim 17, wherein:

the time-series sensor data is obtained in one or more manufacturing processes of devices; and the machine learning model is trained to classify the devices based on the time-series sensor data.

* * * * *